(12) United States Patent
Shimizu et al.

(10) Patent No.: US 9,604,298 B2
(45) Date of Patent: Mar. 28, 2017

(54) METHOD OF MANUFACTURING SCREW THREAD AND SCREW THREAD

(75) Inventors: Toshiyuki Shimizu, Okazaki (JP); Masao Kobayashi, Okazaki (JP); Kenji Nishikawa, Okazaki (JP); Seiji Otani, Okazaki (JP); Takaya Nishikawa, Okazaki (JP); Manabu Takeda, Okazaki (JP)

(73) Assignee: RICOH ELEMEX CORPORATION, Okazaki-Shi, Aichi (JP)

( * ) Notice: Subject to any disclaimer, the term of this patent is extended or adjusted under 35 U.S.C. 154(b) by 424 days.

(21) Appl. No.: 14/127,193

(22) PCT Filed: Jul. 27, 2012

(86) PCT No.: PCT/JP2012/069090
§ 371 (c)(1),
(2), (4) Date: Dec. 18, 2013

(87) PCT Pub. No.: WO2013/027534
PCT Pub. Date: Feb. 28, 2013

(65) Prior Publication Data
US 2014/0141896 A1 May 22, 2014

(30) Foreign Application Priority Data

Aug. 25, 2011 (JP) .................. 2011-183949
Aug. 25, 2011 (JP) .................. 2011-183950

(51) Int. Cl.
*B23G 9/00* (2006.01)
*B23G 1/02* (2006.01)
(Continued)

(52) U.S. Cl.
CPC .............. *B23G 9/00* (2013.01); *B23B 5/46* (2013.01); *B23G 1/00* (2013.01); *B23G 1/02* (2013.01); *B23G 9/001* (2013.01)

(58) Field of Classification Search
CPC ... B23G 1/02; B23G 3/10; B23G 9/00; B23G 9/001; B23G 9/004; B23G 2210/08;
(Continued)

(56) References Cited

U.S. PATENT DOCUMENTS 1,488,521 A * 4/1924 Woodward ............... B23G 7/00
408/1 R
3,176,746 A * 4/1965 Walton .................... F16B 39/28
411/259

(Continued)

FOREIGN PATENT DOCUMENTS

JP   55-037281    3/1980
JP   62-079913    4/1987
(Continued)

OTHER PUBLICATIONS

International Search Report and Written Opinion for PCT/JP2012/069090, Aug. 30, 2012.
(Continued)

*Primary Examiner* — Edward Tolan
(74) *Attorney, Agent, or Firm* — McClure, Qualey & Rodack, LLP

(57) ABSTRACT

The removal starting position (8S1) of a first removal process and the four removal starting positions (8S21-8S24) in a second removal process are established on an imaginary circle (7I) with a prescribed radius (R) that is inscribed in the apex (7C) of an incomplete thread part (7a). In each removal process, the tip of the screw thread cutting tool shaves off the apex (7C) of the incomplete thread part (7a) into respective recesses, contacting the imaginary inscribed circle (7I) from the outside (above). The multiple cutting surfaces of the apex (7C) are formed in parallel helices (that is, as mutually adjacent helical recesses) from the starting position to the ending position of the incomplete thread part. Points and burrs in the incomplete thread part can thereby be eliminated
(Continued)

Detailed illustration of section A or reduced without loss of the ability to screw together with a partner threaded fastener (threaded portion).

4 Claims, 17 Drawing Sheets

(51) Int. Cl.
*B23B 5/46* (2006.01)
*B23G 1/00* (2006.01)

(58) Field of Classification Search
CPC ............ B23G 2210/28; B23G 2210/41; B23G 2210/48; B23G 2240/36; B23G 1/32; B23G 1/38; B23G 1/50; F16B 33/02
USPC .............................................. 470/10; 411/411
See application file for complete search history.

(56) References Cited

U.S. PATENT DOCUMENTS

| | | | | |
|---|---|---|---|---|
| 3,339,389 A * | 9/1967 | Mosow | ................. | B21H 3/025 411/334 |
| 3,426,642 A * | 2/1969 | Phipard, Jr. | ......... | F16B 25/0021 411/417 |
| 3,469,491 A * | 9/1969 | Munsey | .............. | F16B 25/0057 411/422 |
| 3,479,675 A * | 11/1969 | Ricca | ....................... | B21K 1/56 411/324 |
| 3,982,575 A * | 9/1976 | Ollis, Jr. | ................. | F16B 39/30 411/310 |
| 4,273,175 A * | 6/1981 | Capuano | ................. | F16B 39/30 411/168 |
| 4,595,324 A * | 6/1986 | Sadri | ................... | F16B 19/1063 411/311 |
| 5,044,853 A * | 9/1991 | Dicke | ..................... | F16B 39/30 411/311 |
| 5,221,234 A * | 6/1993 | Pakos | ...................... | B23G 1/06 470/10 |
| 5,259,715 A * | 11/1993 | Harle | ...................... | F16B 39/28 411/311 |
| 5,836,731 A * | 11/1998 | Goodwin | .............. | F16B 35/047 411/386 |
| 5,863,165 A * | 1/1999 | Schulte | ............... | F16B 25/0052 411/386 |
| 6,062,786 A * | 5/2000 | Garver | .................. | F16B 35/047 411/386 |
| 6,371,709 B1 * | 4/2002 | Papafotiou | ............... | B21H 3/02 238/372 |
| 8,221,119 B1 * | 7/2012 | Valen | ..................... | A61C 8/0025 433/174 |
| 8,535,358 B2 * | 9/2013 | Willert | ............... | A61B 17/8625 606/309 |
| 2002/0042302 A1* | 4/2002 | Kato | ........................ | B21K 1/56 470/19 |
| 2003/0156921 A1* | 8/2003 | Nagawa | .................. | F16B 39/30 411/411 |
| 2011/0033263 A1* | 2/2011 | Matsubayashi | ......... | F16B 39/30 411/366.1 |

FOREIGN PATENT DOCUMENTS

| | | | | |
|---|---|---|---|---|
| JP | 63-7223 A * | 1/1988 | ............... | B23G 1/38 |
| JP | 01-30005 | 6/1989 | | |
| JP | 2003-094248 A | 4/2003 | | |
| WO | 98/43769 A1 * | 10/1998 | ............... | B23G 1/00 |

OTHER PUBLICATIONS

English translation of abstract of JP 62-079913 (published Apr. 13, 1987).
English translation of abstract of JP 55-037281 (published Mar. 15, 1980).

* cited by examiner

Detailed illustration of section A

Detailed illustration of section B

FIG.11
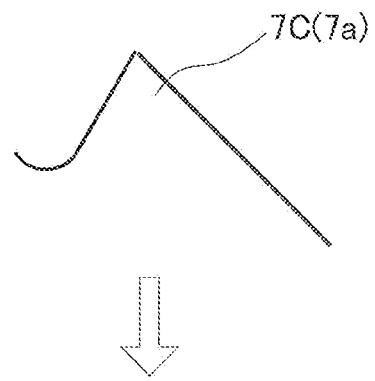
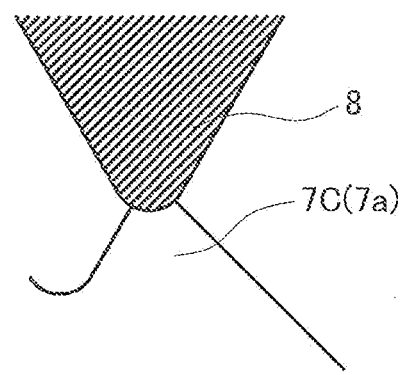
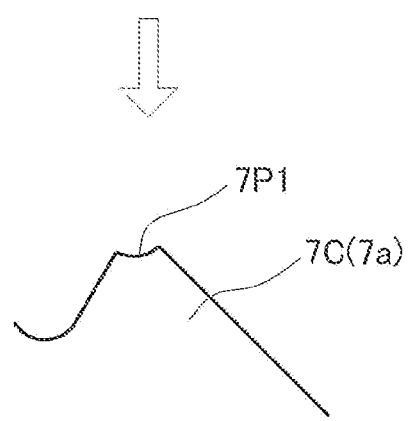
First removal process

Second removal process (first round)

Second removal process (second round)

Second removal process (third round)

Second removal process (fourth round)

FIG.17
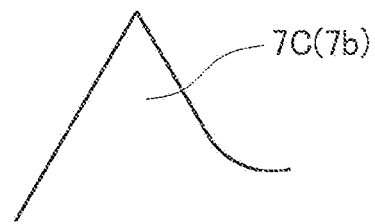
7C(7b)
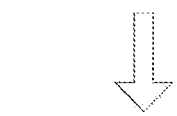
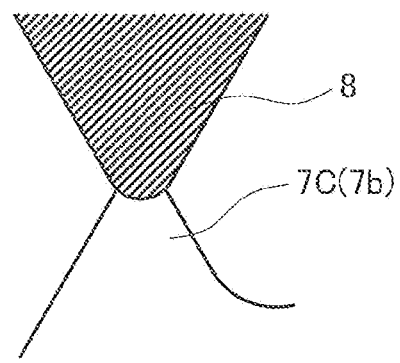
8
7C(7b)
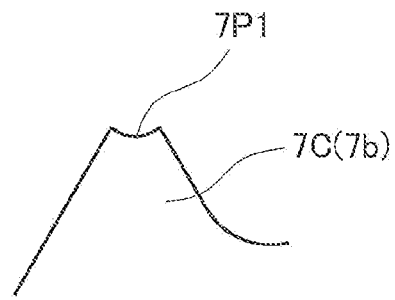
7P1
7C(7b)
First removal process Second removal process (first round)

Second removal process (second round)

Second removal process (third round)

Second removal process (fourth round)

Detailed illustration of section C

Detailed illustration of section D

FIG.25₂
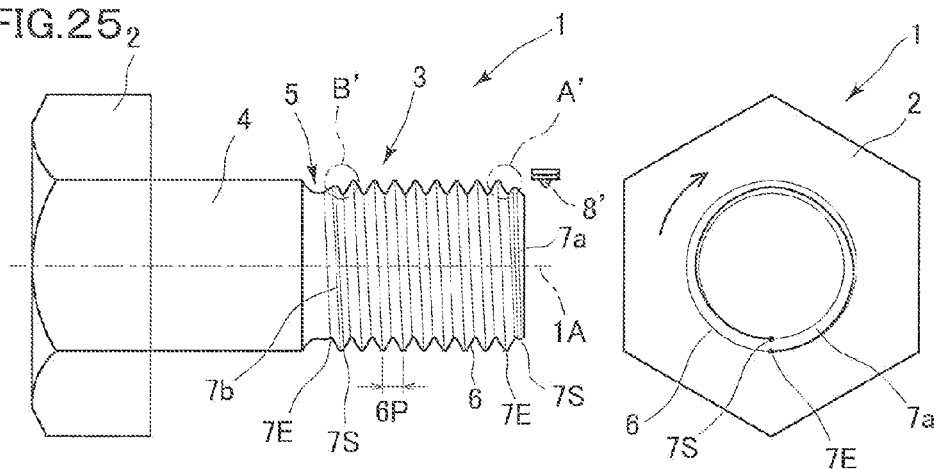
FIG.26
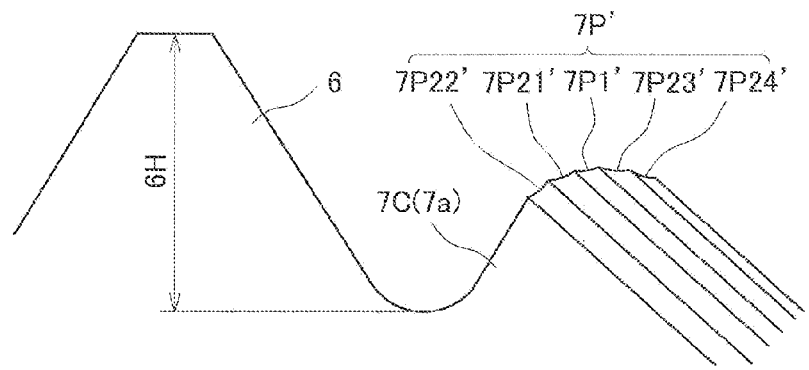
Detailed illustration of section A'
FIG.27
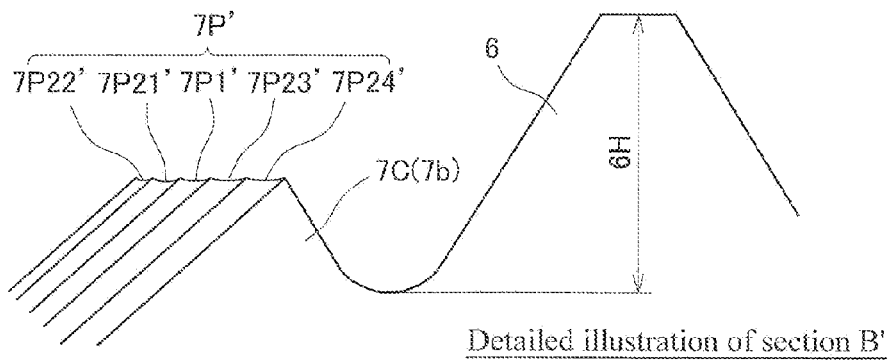
Detailed illustration of section B'

METHOD OF MANUFACTURING SCREW THREAD AND SCREW THREAD

CROSS REFERENCE TO RELATED APPLICATIONS

This application is the 35 U.S.C. §371 national stage of PCT application entitled with "Method Of Manufacturing Screw Thread and Screw Thread" having Ser. No. PCT/JP2012/069090, filed on Jul. 27, 2012. This application also claims priority to and benefit of Japanese Application No. 2011-183949, filed on Aug. 25, 2011 and Japanese Application 2011-183950, filed on Aug. 25, 2011, which is incorporated by reference in its entity.

BACKGROUND OF THE INVENTION

Field of the Invention

The invention relates to a method of manufacturing a screw thread including a process for partly removing an apex of a ridge in an incomplete thread part formed in a threaded fastener by screw thread cutting. The invention further provides a threaded fastener.

Background Art

In the threaded fasteners, such as bolts, nuts, and set-screws, an incomplete thread part is mostly formed by screw thread cutting. Conventionally, the incomplete thread part is formed with a relief or chamfer part of a screw thread cutting tool during the screw thread cutting in a thread-starting part (or a thread-ending part), that is, a front end part or a rear end part of a complete thread part (one both sides). The incomplete thread part is a part where the shape of the screw thread (height or sectional shape of the screw thread) is incomplete. More specifically describing the incomplete thread part, the height of the screw thread constantly changes from zero height to a regular height of the complete thread part (or from the regular height to zero height) as the threaded fastener is rotated, and the angle and the flank (crest-root connecting surface) of the screw thread are not as stable as the complete thread part.

Comparing the incomplete thread part to the complete thread part, the apex of the ridge is more often formed with sharp points, and the occurrence of burrs at the apex is more likely. It is desirable that the formation of these sharp points and burrs be avoided because they often lead to such an unfavorable event as galling when engaged with another threaded portion.

So far there have been disclosed different techniques for solving these problems of the incomplete thread part. For example, a screw thread cutting tool is moved synchronously with the pitch of a screw thread already formed so that the incomplete thread part is traced and reprocessed (reprocessed to be corrected) (see the Patent Document 1), a sharp apex of the incomplete thread part is cut off at a certain height position so that an even surface is formed in a vertically intermediate section of the incomplete thread part (see the Patent Document 2), or the whole incomplete thread part is removed (see the Patent Document 3).

DESCRIPTION OF THE RELATED ART

[Patent Document 1] Japanese Laid-Open Patent Publication No. 62-079913
[Patent Document 2] Japanese Laid-Open Patent Publication No. 2003-094248
[Patent Document 3] Japanese Patent Publication No. 01-30005

It is disclosed in the Patent Documents that these sharp points and burrs formed in the incomplete thread part are removed by processing the incomplete thread part. However, it is difficult to remove such sharp points and burrs from the incomplete thread part by simply tracing and reprocessing the incomplete thread part as disclosed in the Patent Document 1 or by partly removing the incomplete thread part above a certain height as disclosed in the Patent Document 2. In the case where the whole incomplete thread part is removed as disclosed in the Patent Document 3 or the incomplete thread part is partly removed above a certain height as described in the Patent Document 2, the engageability of a threaded fastener (threaded portion) with another threaded fastener may be undermined; the engagement with another threaded fastener may not be smoothly performed, or some looseness may be unavoidable during the engagement.

SUMMARY OF THE INVENTION

Problems to be Solved by the Invention

The invention provides a method of manufacturing a screw thread wherein sharp points and burrs that may be formed in an incomplete thread part are removed or reduced without undermining the engageability of a threaded fastener (threaded portion) with another threaded fastener. The invention further provides a threaded fastener.

Means for Solving the Problems

To solve the above problems, the invention is a method of manufacturing a screw thread,
including a process for removing an apex of a ridge in an incomplete thread part helically formed in a work by screw thread cutting, by a tool equipped with a cutting blade, wherein
in a state where the tool is located so that the cutting blade cuts into the apex of the incomplete thread part in a width smaller than a thread pitch and the work is rotated around a thread axis that is a center line of the work, the cutting blade of the tool is moved in a direction resulting from combining a movement in a direction of the thread pitch and a movement in a direction of height of the incomplete thread part to allow the cutting blade of the tool to cut the apex through a linear relative movement along the apex helically formed in the incomplete thread part, so that one round of cutting for the apex of the incomplete thread part leaves one helical and dented cutting mark, the one round of cutting helically performed is repeated plural times with the cutting blade of the tool being positionally displaced relative to the incomplete thread part in at least the direction of the thread pitch, and the apex of the incomplete thread part is accordingly removed so that a plurality of the helical cutting marks are adjacent to one another and continuous in the direction of the thread pitch.

According to the method of manufacturing a screw thread, the removal process is repeated plural times after the screw thread cutting is over so that the plural cutting marks (for example, typically cutting surfaces) adjacent to one another are helically formed in a predetermined area or whole area of the incomplete thread part. This method, therefore, can easily remove any sharp points and burrs from the apex of the incomplete thread part. The method does not remove the whole incomplete thread part but cut off the apex of the incomplete thread part alone, thereby maintaining a favorable engageability with another threaded fastener (threaded portion). Desirably, the process for removing the apex is repeatedly performed plural times for the whole area of the incomplete thread part. However, a reasonable effect can still be obtained by removing a minimum required area of the incomplete thread part instead of subjecting the whole area to the process.

To repeatedly perform the helical removal process plural times for the apex of the incomplete thread part (plural processing steps), it can be arbitrarily decided how many times or in what order the plural removal processing steps are performed. For example, the removal process may be repeated plural times with a removal starting position (position of a tool front edge) being displaced in the thread-pitch direction by each cutting mark or by a predetermined number of cutting marks, or the apex is divided in a plurality of regions in the thread-pitch direction (for example, regions of the shaft portion on the head, intermediate, and tail sides) and the removal process is performed for each of the regions once or plural times. When the removal process is performed in any of these manners, a plurality of helical cutting marks are finally formed in the apex of the incomplete thread part. A plurality of cutting marks may be formed with a cross section of the apex partly unremoved.

The threaded fastener (threaded portion), to which the invention is applied, includes an external screw thread and an internal screw thread. The threaded fastener includes different types of threaded fasteners; bolts, nuts, wood screws, machine screws, vises, setscrews, and self-tapping screws. The invention is applicable to all of screw threads that are in cross section; triangular thread, square thread, buttress thread, trapezoidal thread, taper thread, and knuckle thread.

The invention is an independent invention relating to a processing method to be applied to an incomplete thread part. When the screw thread cutting is performed in a first step and the incomplete thread part is processed in a second step by using the tool used in the screw thread cutting, the incomplete thread part can be processed with high precision and efficiently with less time.

To process the incomplete thread part having a plurality of helical cutting marks continuously formed, the whole incomplete thread part may be formed with roundness with a center part of the ridge thereof being raised to a larger height and the apex of the incomplete thread part may be then removed, or the apex of the incomplete thread part may be removed substantially in parallel with the thread axis.

The invention further provides a screw thread having an incomplete thread part, wherein a plurality of helical and dented cutting marks are formed in an apex of the incomplete thread part in a manner that the cutting marks are adjacent to one another and continuous in a direction of a thread pitch.

In the screw thread where the plural cutting marks adjacent to one another are helically formed in a predetermined area or whole area of the incomplete thread part, the apex of the incomplete thread part is very unlikely to have any sharp points or burrs. In the screw thread where the whole incomplete thread part is not removed but the apex of the incomplete thread part alone is cut off, a favorable engageability with another threaded fastener (threaded portion) is maintained.

BRIEF DESCRIPTION OF THE DRAWINGS

FIG. 11 is a schematic illustration of the first removal process.

FIG. 17 is a schematic illustration of the first removal process.

FIG. 25 is a front view of a modified example of the illustration of FIG. 1 and a side view of the modified example when viewed from the side of its tail.

FIG. 26 is an enlarged front view of a section A' illustrated in FIG. 25.

FIG. 27 is an enlarged front view of a section B' illustrated in FIG. 25.

MODES FOR CARRYING OUT THE INVENTION

EXAMPLE 1

An embodiment of the invention is hereinafter described referring to examples illustrated in the accompanied drawings. FIGS. 1 to 21 illustrate an example in which the invention is applied to a hexagon head bolt as a threaded fastener. In a hexagon head bolt 1 illustrated in FIG. 1, a screw thread is formed in a shaft portion 3 when a screw thread cutting tool 8 is moved at a predetermined pitch 6P in parallel with a thread axis 1A from the tail side toward the side of a head 2 of the shaft portion 3 while the shaft portion 3 is being rotated clockwise when viewed from the head-2 side around the thread axis 1A as a rotation center (counterclockwise when viewed from the tail side of the shaft portion 3 as illustrated with an arrow). A screw thread cutting direction (that is, a direction where the shaft portion 3 is rotated during the screw thread cutting) is a direction of rotation for the screw thread to advance when engaged with another threaded fastener. In the case of a right-hand thread, the direction of rotation for the screw thread to advance during the engagement is the clockwise direction where the thread axis 1A is the rotation center when viewed from a thread-ending side but is the counterclockwise direction when viewed from a thread-starting side.

Figure 1:
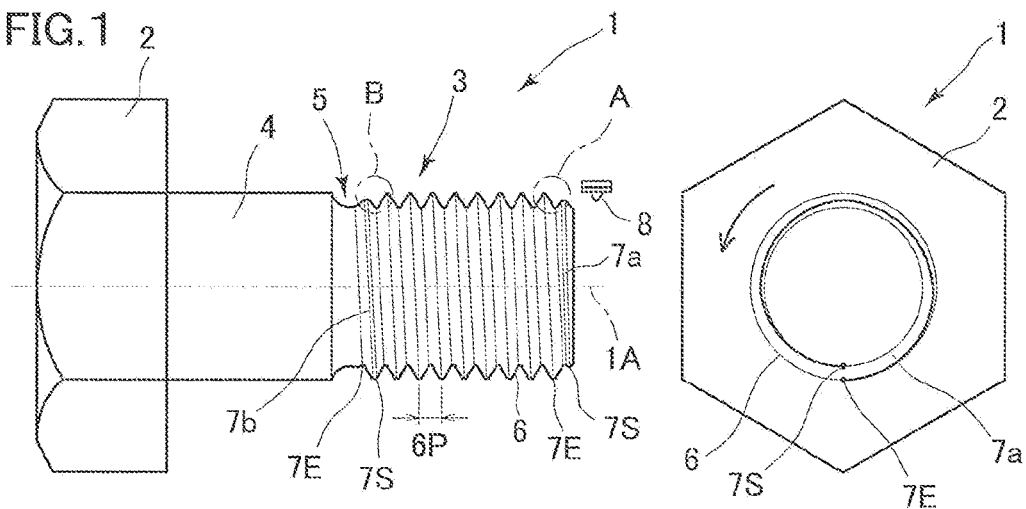
FIG. 1 is a front view of a hexagon head bolt, an example of the threaded fastener, to which the invention is applied, and a side view of the hexagon head bolt when viewed from the side of its tail.
Figure 2:
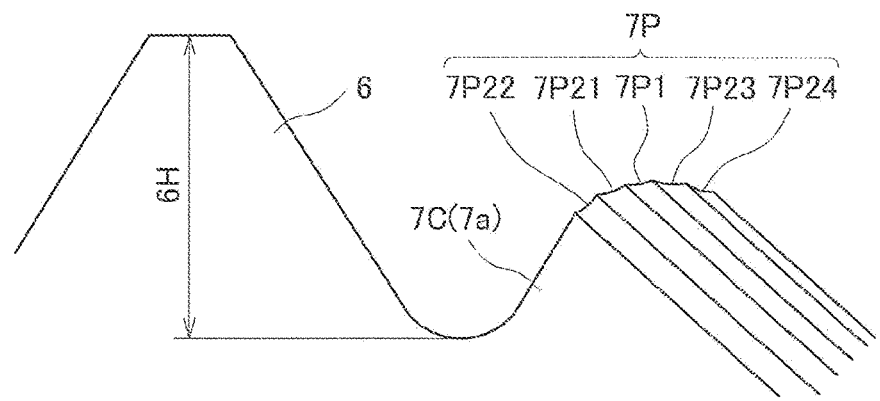
FIG. 2 is an enlarged front view of a section A illustrated in FIG. 1.
Figure 3:
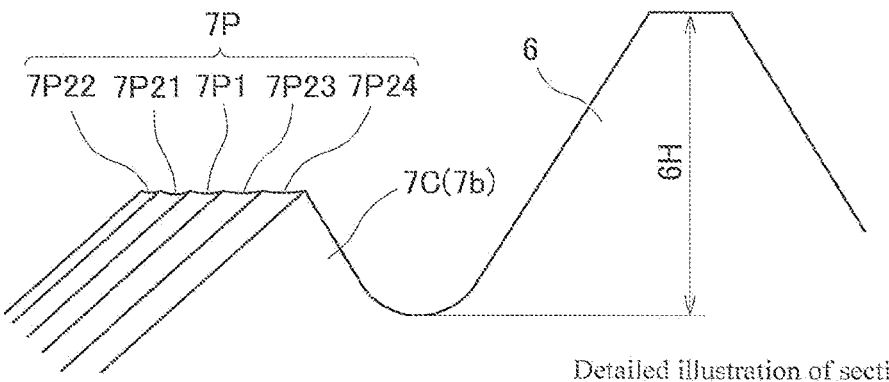
FIG. 3 is an enlarged front view of a section B illustrated in FIG. 1.

The shaft portion 3 of the hexagon head bolt 1 has a complete thread part 6 including an external thread (right-hand thread, single screw thread) formed at the pitch 6P to a thread height 6H (see FIGS. 2 and 3). The shaft portion 3 further has; an incomplete thread part 7a formed on the tail side of the complete thread part 6 (on the thread-starting side), and another incomplete thread part 7b on the head-2 side thereof (on the thread-ending side). Referring to the side view of FIG. 1, in the tail-side incomplete thread part 7a of this example, a length from a starting position 7S where the thread height is zero to an ending position 7E where the thread height is 6H is a lap of thread, that is, one pitch. In one pitch, the thread height continues to change along with the rotation. Similarly, in the head-2-side incomplete thread part 7b of this example, a length from a starting position 7S where the thread height is 6H to an ending position 7E where the thread height is zero is to a lap of thread.

In a neck area below the head 2, an unthreaded part of the shaft portion 3 is left as a cylindrical portion 4. A thread undercut 5 is provided between the cylindrical portion 4 and the incomplete thread part 7b to facilitate the smooth movement of the screw thread cutting tool 8.

As illustrated in FIG. 2, an apex 7c of the ridge in the incomplete thread part 7a on the tail side has cutting surfaces 7P (7P1 and 7P21 to 7P24) including a plurality of (five in total in this example) cutting marks formed by cutting with a front edge of the screw thread cutting tool 8 (see FIG. 1). The cutting surfaces 7P are helically formed in parallel from the starting position 7S to the ending position 7E of the incomplete thread part 7a (see FIG. 1), in other words, formed continuously and adjacent to one another in a thread pitch direction. In a microscopic view, the front edge of the screw thread cutting tool 8 is equipped with a cutting blade having a width smaller than the thread pitch 6P illustrated in FIG. 1, and the front edge is formed with some degree of roundness (for example, radius of the edge is 0.1 mm). The cutting surfaces 7P (7P1 and 7P21 to 7P24) formed in the apex 7C illustrated in FIG. 2, therefore, have widths smaller than the thread pitch 6P and recessed or dented shapes because of the roundness on the front edge of the screw thread cutting tool 8. The plural cutting surfaces 7P illustrated in FIG. 2 are each curved so that its center of the ridge is raised, and are adjacent to one another and continuous in a direction of the thread axis 1A (thread pitch direction) (which will be described in detail later).

As illustrated in FIG. 3, an apex 7C of the ridge in the incomplete thread part 7b on the head-2 side too has cutting surfaces 7P (7P1 and 7P21 to 7P24) including a plurality of (five in total in this example) cutting marks formed by cutting with the front edge of the screw thread cutting tool 8. The cutting surfaces 7P are helically formed in parallel from the starting position 7S to the ending position 7E of the incomplete thread part 7b, in other words, formed continuously and adjacent to one another in the thread pitch direction. The cutting surfaces 7P (7P1 and 7P21 to 7P24) formed in the apex 7C illustrated in FIG. 3 also have widths smaller than the pitch 6P and recessed or dented shapes because of the roundness on the front edge of the screw thread cutting tool 8. The plural cutting surfaces 7P illustrated in FIG. 3 are adjacent to one another in parallel with the thread axis 1A (see FIG. 1) and continuous in the direction of the thread axis 1A (which will be described in detail later).

Figure 4:
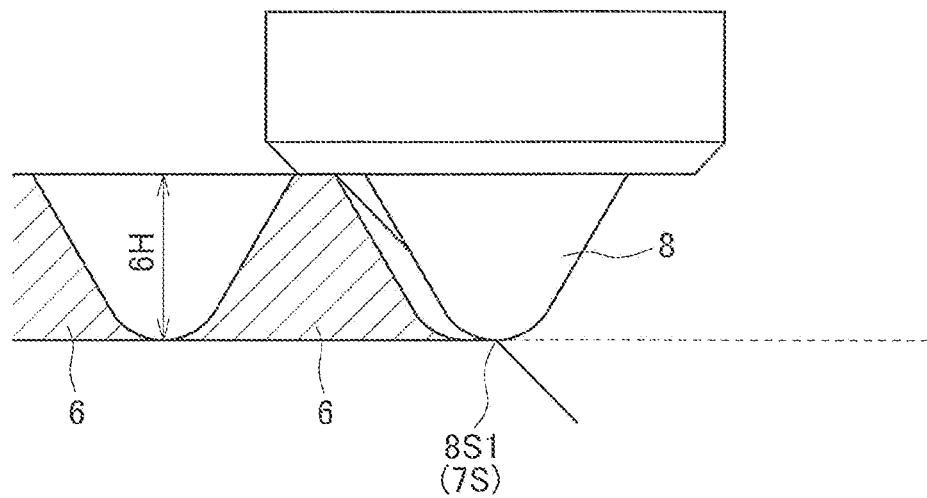
FIG. 4 is an illustration of the formation of an cutting surface in a first removal process.

FIGS. 4 to 9 are illustrations of the formation of an cutting surface in a first removal process. As illustrated in FIG. 4, in the first removal process performed to remove the apex 7C of the incomplete thread part 7a, the starting position 7S of the incomplete thread part 7a in the direction of rotation is synchronized with the front edge of the screw thread cutting tool 8 so that a removal starting position 8S1 of the incomplete thread part 7a coincides with the starting position 7S of the incomplete thread part 7a.

Figure 5:
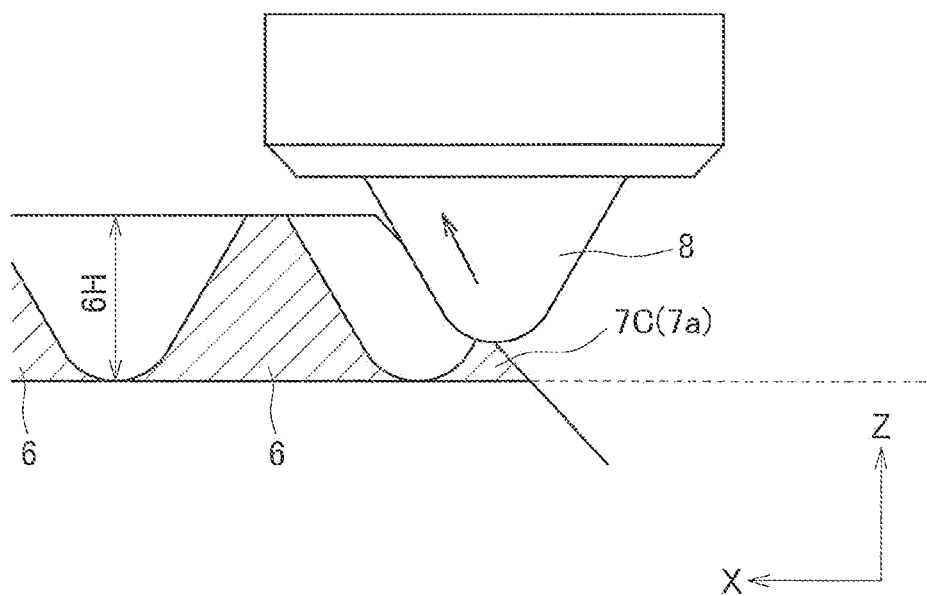
FIG. 5 is an illustration continued from FIG. 4.
Figure 6:
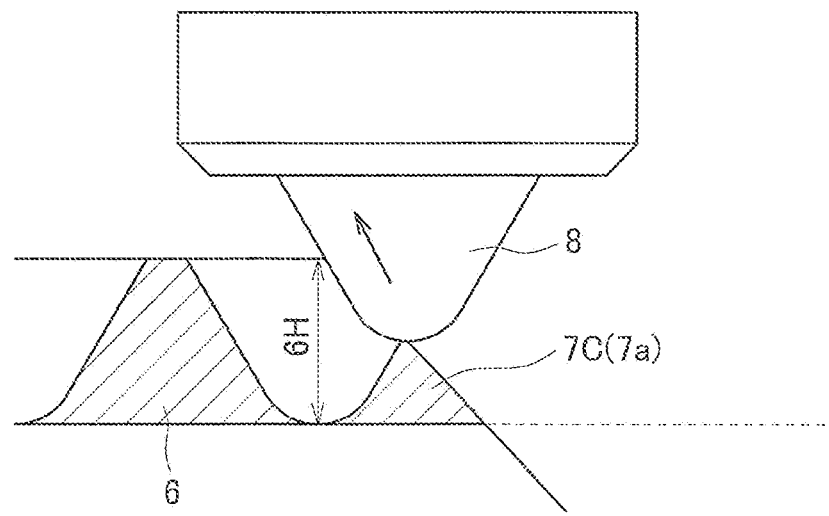
FIG. 6 is an illustration continued from FIG. 5.
Figure 7:
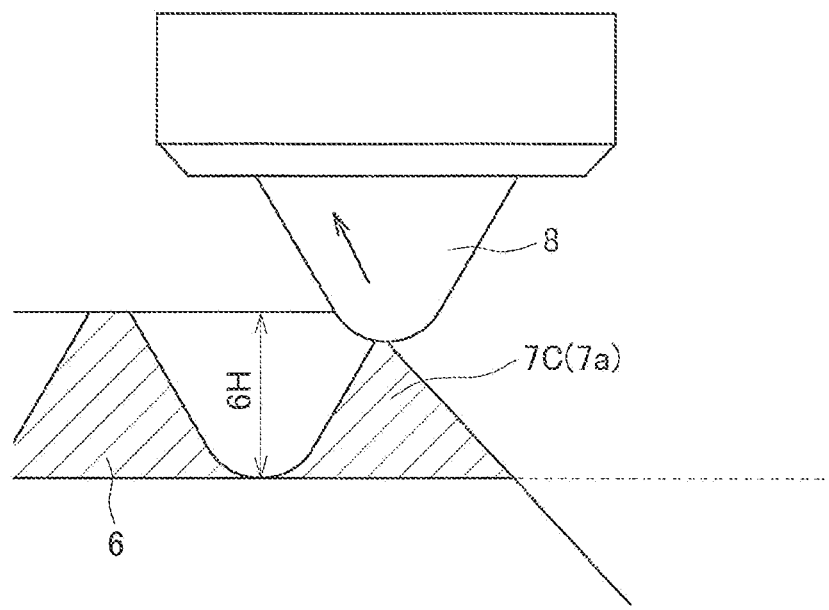
FIG. 7 is an illustration continued from FIG. 6.

As illustrated in FIGS. 5 to 7, while the incomplete thread part 7a (hexagon head bolt 1) is being rotated in the thread cutting direction, the screw thread cutting tool 8 is moved in a diagonal direction relative to the thread axis 1A (see FIG. 1) (in a direction illustrated with an arrow), so that the apex 7C of the incomplete thread part 7a is removed in a recessed shape. Because the direction where the incomplete thread part 7a is rotated in the first removal process is the same as the thread cutting direction (in the direction of rotation during the screw thread cutting), it is more specifically the counterclockwise direction as illustrated with an arrow in the side view of FIG. 1. The screw thread cutting tool 8 moves in a tapered manner that is defined depending on the pitch 6P and the thread height 6H of the complete thread part 6. In the cross sections illustrated in FIGS. 5 to 7 including the thread axis 1A, the screw thread cutting tool 8 two-dimensionally moves in a diagonal direction resulting from combining the direction of the thread axis 1A (right-left direction X, that is, the thread pitch direction) and a direction orthogonal to the thread axis 1A (up-down direction Z). However, the movement of the screw thread cutting tool 8 may include a three-dimensional movement.

Figure 8:
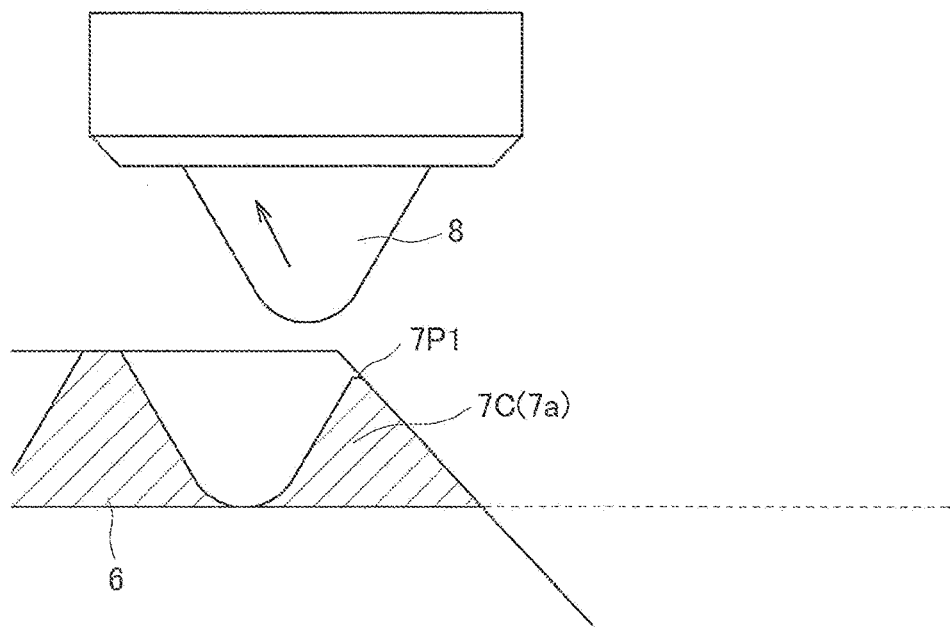
FIG. 8 is an illustration continued from FIG. 7.
Figure 9:
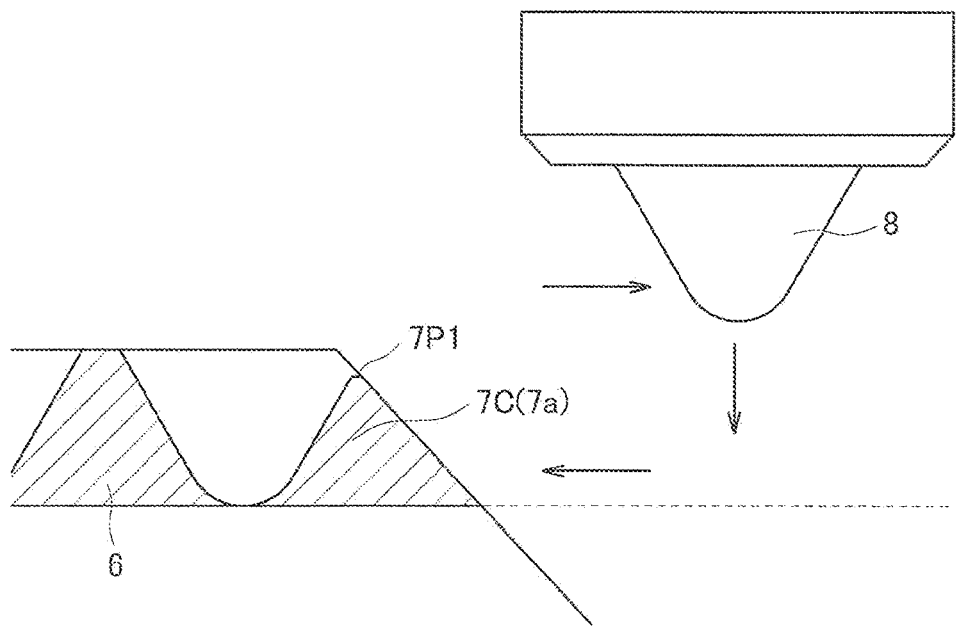
FIG. 9 is an illustration continued from FIG. 8.

Then, as illustrated in FIGS. 8 and 9, the cutting surface 7P1 cut in a recessed shape in a predetermined depth by the front edge of the screw thread cutting tool 8 is helically formed in the apex 7C of the incomplete thread part 7a from the starting position 7S to the ending position 7E of the incomplete thread part 7a (see FIGS. 1 and 4). The screw thread cutting tool 8 that completed the first removal process temporarily moves upward as illustrated in FIG. 8 and then moves to a removal starting position 8S21 in the first round of a second removal process (FIG. 10) as illustrated in FIG. 9. In the case of a thread whose nominal size is M10 to M20, the depth of the cutting surface 7P1 is about 0.01 to 0.5 mm.

Figure 10:
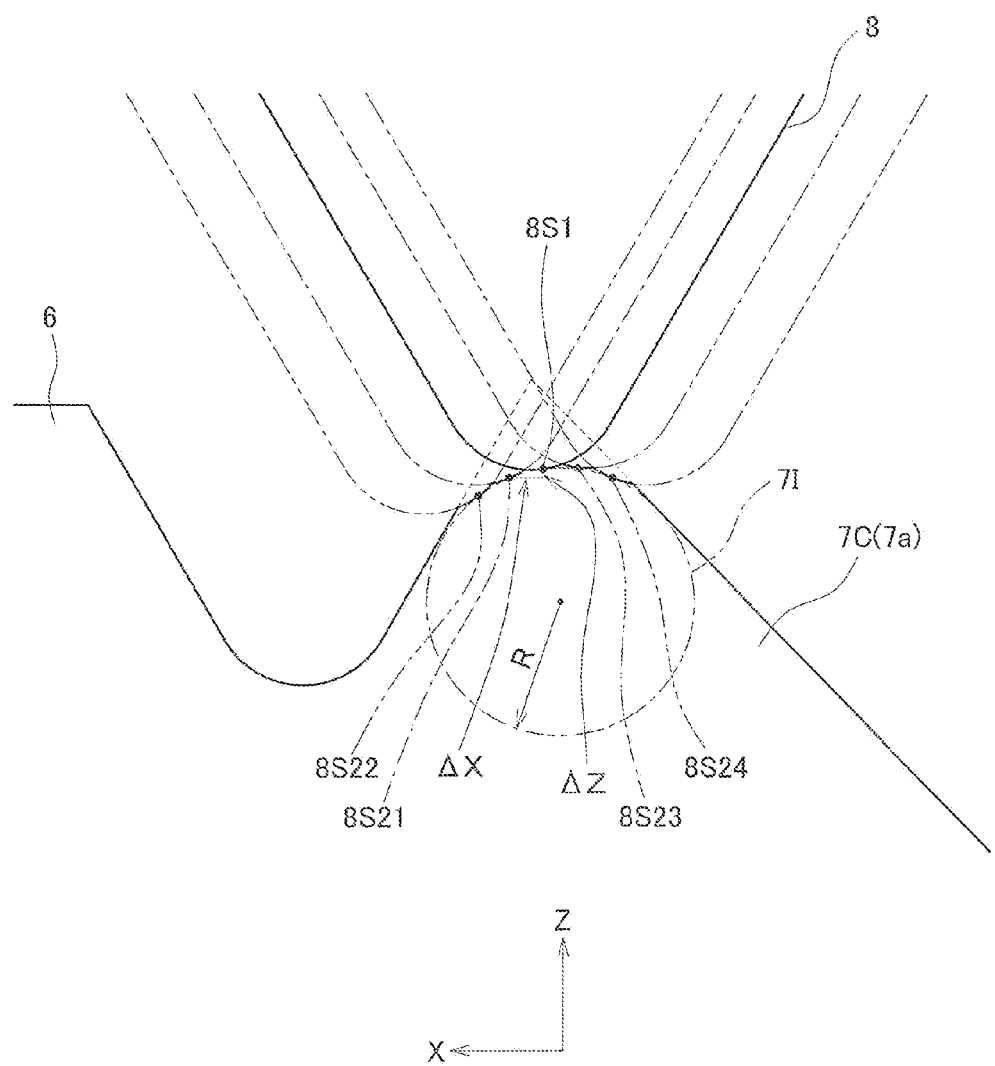
FIG. 10 is an illustration of processing steps for removing an apex of a ridge in an incomplete thread part formed on the tail side illustrated in FIG. 1.

As illustrated in FIG. 10, in the first removal process for the tail-side incomplete thread part, the front edge of the screw thread cutting tool 8 (that is, the removal starting position 8S1) coincides with the starting position 7S of the incomplete thread part 7a (see FIG. 4). The screw thread cutting tool 8 moves in a tapered manner, thereby removing the apex 7C of the incomplete thread part 7a in a recessed shape (see FIGS. 5 to 7). The screw thread cutting tool 8 that completed the first removal process then moves to the removal starting position 8S21 in the first round of the second removal process (see FIGS. 8 and 9).

The removal starting position 8S21 in the first round of the second removal process is set at a position displaced from the removal starting position 8S1 of the first removal process by an amount of displacement ΔX and an amount of displacement ΔZ respectively in the direction of the thread axis 1A (right-left direction X) and the direction orthogonal to the thread axis 1A (up-down direction Z). In this example, the first-round removal starting position 8S21 is set at a position leftward and downward relative to the removal starting position 8S1 (on the head-2 side and on the side of the thread axis 1A). Similarly to the first removal process, the screw thread cutting tool 8 moves in a tapered manner, thereby removing the apex 7C of the incomplete thread part 7a. The screw thread cutting tool 8 that completed the first round of the removal process then moves to a removal starting position 8S22 in the second round.

The removal starting position 8S22 in the second round of the second removal process is set at a position further displaced from the first-round removal starting position 8S21 in the right-left direction X and in the up-down direction Z. In this example, the second-round removal starting position 8S22 is set at a position leftward and downward relative to the first-round removal starting position 8S21 (on the head-2 side and on the side of the thread axis 1A). Similarly to the first removal process, the screw thread cutting tool 8 moves in a tapered manner, thereby removing the apex 7C of the incomplete thread part 7a. The screw thread cutting tool 8 that completed the second round of the removal process then moves to a removal starting position 8S23 in the third round.

The removal starting position 8S23 in the third round of the second removal process is set at a position further displaced from the removal starting position 8S1 of the first removal process in the right-left direction X and in the up-down direction Z. In this example, the third-round removal starting position 8S23 is set at a position rightward and downward which is on the opposite side relative to the removal starting position 8S1 of the first removal process in the X direction (on the tail side and on the side of the thread axis 1A). Similarly to the first removal process, the screw thread cutting tool 8 moves in a tapered manner, thereby removing the apex 7C of the incomplete thread part 7a. The screw thread cutting tool 8 that completed the third round of the removal process then moves to a removal starting position 8S24 in the fourth round.

The removal starting position 8S24 in the fourth round of the second removal process is set at a position further displaced from the third-round removal starting position 8S23 in the right-left direction X and in the up-down direction Z. In this example, the fourth-round removal starting position 8S24 is set at a position rightward and downward relative to the third-round removal starting position 8S23 (on the tail side and on the side of the thread axis 1A). Similarly to the first removal process, the screw thread cutting tool 8 moves in a tapered manner, thereby removing the apex 7C of the incomplete thread part 7a. The screw thread cutting tool 8 that completed the fourth round of the removal process then moves to a predetermined standby position.

As illustrated in FIG. 10, the removal starting position 8S1 of the first removal process and the four removal starting positions 8S21 to 8S24 of the second removal process are set on an imaginary circle 7I with a predetermined radius R inscribed in the apex 7C of the incomplete thread part 7a. In the respective removal processing steps, therefore, the front edge of the screw thread cutting tool 8 cuts off the apex 7C of the incomplete thread part 7a in a recessed shape in contact with the imaginary inscribed circle 7I from outside (upper side).

In this example, the first removal process is performed once and the second removal process is performed four times. As a result, five cutting surfaces 7P (7P1 and 7P21 to 7P24) illustrated in FIG. 2 are helically formed in parallel (helically and adjacently formed in a recessed shape) in the apex 7C of the ridge in the incomplete thread part 7a on the tail side. These cutting surfaces 7P (7P1 and 7P21 to 7P24) constitute the surface of the apex 7C of the incomplete thread part 7a in contact with the imaginary inscribed circle 7I from outside (upper side).

Next, the processing steps for removing the apex 7C of the ridge in the incomplete thread part 7a on the tail side are hereinafter schematically described referring to FIGS. 11 to 15.

First Removal Process (FIG. 11)

With the removal starting position 8S1 coinciding with the starting position 7S of the incomplete thread part 7a (see FIG. 4), the cutting blade is located so as to cut into the target part in a width smaller than the thread pitch 6P. Then, the screw thread cutting tool 8 moves in a tapered manner and thereby removes the apex 7C of the incomplete thread part 7a in a recessed shape. As a result, the cutting surface 7P1 is helically formed in the apex 7C.

Figure 12:
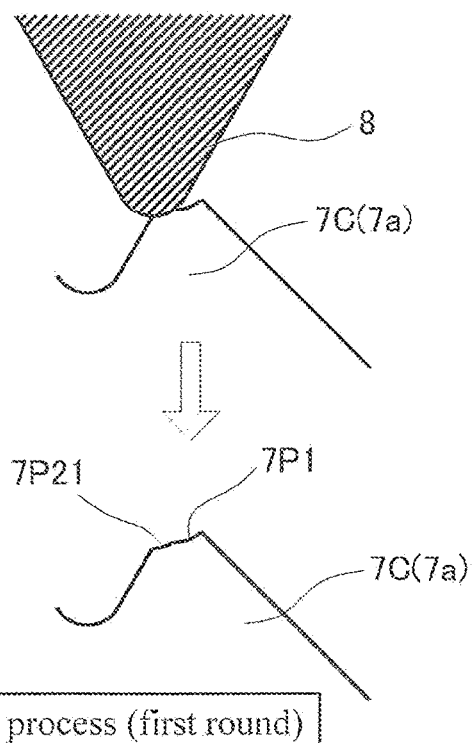
FIG. 12 is a schematic illustration of a second removal process (first round).

(First Round of) Second Removal Process (FIG. 12)

The removal starting position 8S21 is set at a position displaced from the removal starting position 8S1 (see FIG. 10). Then, the screw thread cutting tool 8 moves in a tapered manner similarly to the first removal process and thereby removes the apex 7C of the incomplete thread part 7a. As a result, the cutting surface 7P21 is helically formed in the apex 7C.

Figure 13:
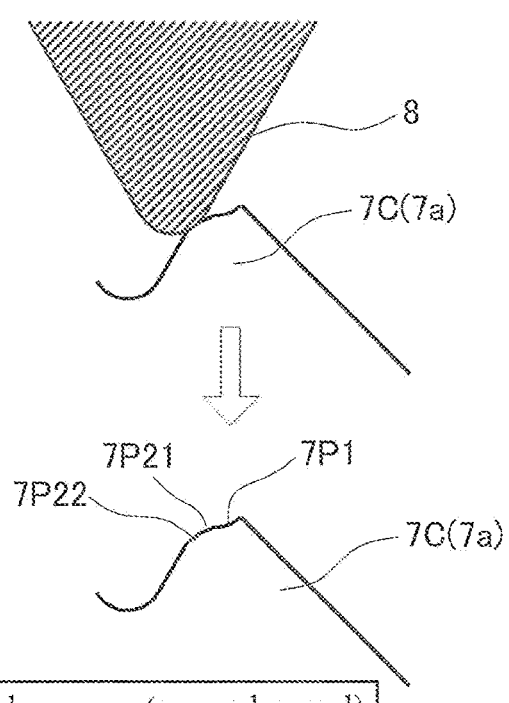
FIG. 13 is a schematic illustration of the second removal process (second round).

(Second Round of) Second Removal Process (FIG. 13)

The removal starting position 8S22 is set at a position further displaced from the removal starting position 8S21 (see FIG. 10). Then, the screw thread cutting tool 8 moves in a tapered manner similarly to the first removal process and thereby removes the apex 7C of the incomplete thread part 7a. As a result, the cutting surface 7P22 is helically formed in the apex 7C.

Figure 14:
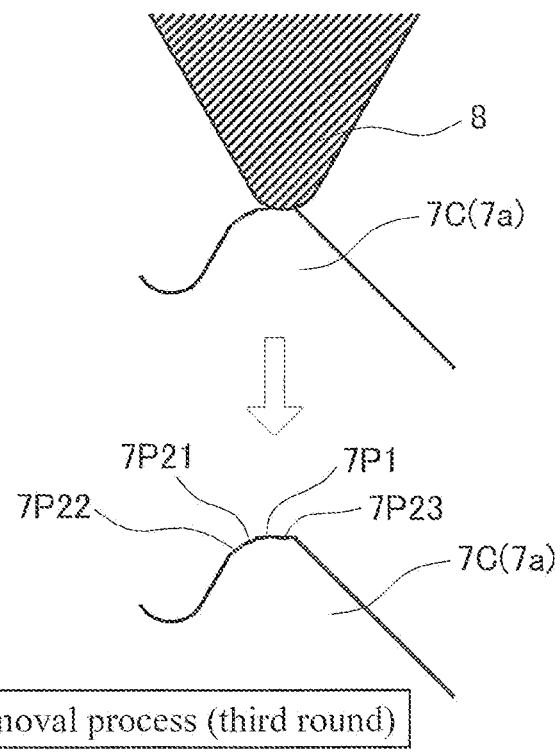
FIG. 14 is a schematic illustration of the second removal process (third round).

(Third Round of) Second Removal Process (FIG. 14)

The removal starting position 8S23 is set at a position displaced toward the opposite side of the removal starting positions 8S21 and 8S22 (see FIG. 10). Then, the screw thread cutting tool 8 moves in a tapered manner similarly to the first removal process and thereby removes the apex 7C of the incomplete thread part 7a. As a result, the cutting surface 7P23 is helically formed in the apex 7C.

Figure 15:
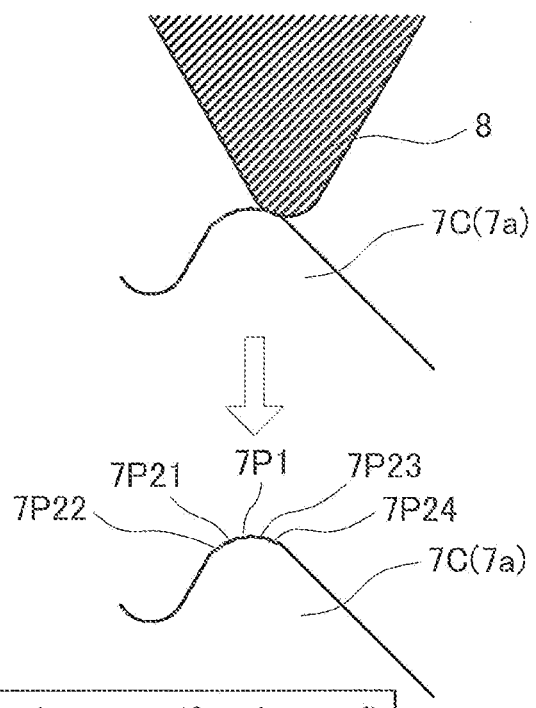
FIG. 15 is a schematic illustration of the second removal process (fourth round).

(Fourth Round of) Second Removal Process (FIG. 15)

The removal starting position 8S24 is set at a position further displaced from the removal starting position 8S23 (see FIG. 10). Then, the screw thread cutting tool 8 moves in a tapered manner similarly to the first removal process and thereby remove the apex 7C of the incomplete thread part 7a. As a result, the cutting surface 7P24 is helically formed in the apex 7C.

In FIG. 10, the first removal process may be omitted as far as the removal starting positions 8S21 to 8S24 of the second removal process can be set without using the removal starting position 8S1 of the first removal process (starting position 7S of the incomplete thread part 7a) as a reference position, and the number of the removal starting positions, 8S21 to 8S24, may be accordingly changed. Of the removal starting positions 8S21 to 8S24 of the second removal process, two of them are paired and set on the opposite sides in the X direction of the removal starting position 8S1 of the first removal process. It is arbitrarily changed how many removal starting positions are set on the respective sides, and the respective removal processing steps may be performed in different orders. The radius R of the imaginary inscribed circle 7I is about 0.1 to 0.5 mm. In the second removal process, the amount of displacement ΔX of the removal starting positions 8S21 to 8S24 in the right-left direction X is about 0.01 to 0.2 mm based on the removal starting position 8S1 of the first removal process used as a reference position, and the amount of displacement ΔZ of these positions in the up-down direction Z is about 0 to 0.2 mm based on the removal starting position 8S1 of the first removal process used as a reference position.

As described, the plural cutting surfaces 7P (7P1 and 7P21 to 7P24) are thus helically formed in parallel in the apex 7C of the incomplete thread part 7a formed on the tail side from the starting position 7S to the ending position 7E of the incomplete thread part 7a. By thus forming cutting surfaces, any sharp points and burrs are easily eliminated from the incomplete thread part 7a. In the respective removal processing steps, the apex 7C of the ridge alone is removed instead of completely removing the whole or a limited area of the incomplete thread part 7a. This helps to maintain a favorable engageability with another threaded fastener (threaded portion). The cutting surfaces 7P (7P1 and 7P21 to 7P24) are continuous in such a curved manner that a center part in the ridge of the incomplete thread part 7a is raised (in other words, in a manner that a center part in each of the corrugations formed by the continuous cutting surfaces 7P protrudes). Thus, any sharp points and burrs are assuredly removed from the apex 7C, and especially the engagement with another threaded fastener (threaded portion) is facilitated.

Figure 16:
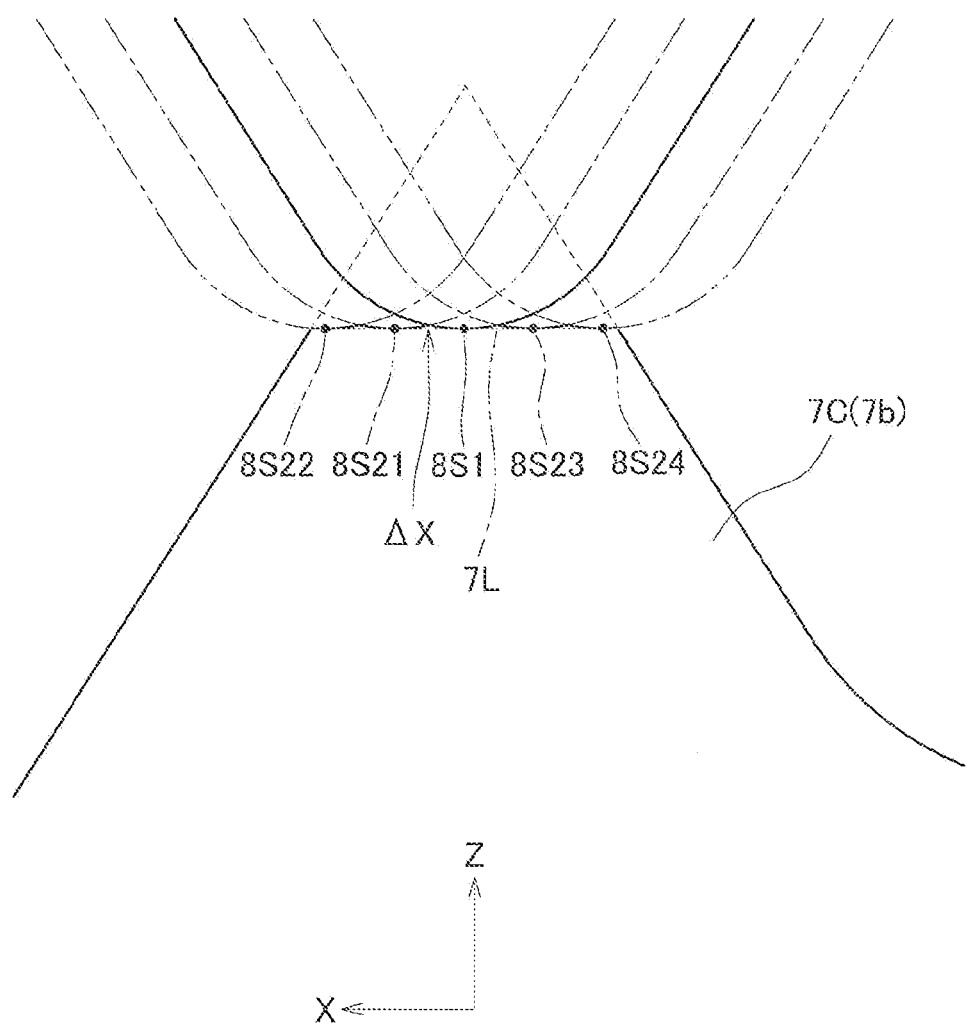
FIG. 16 is an illustration of processing steps for removing an apex of a ridge in an incomplete thread part formed on a head side illustrated in FIG. 1.

As illustrated in FIG. 16, in the first removal process of the head-side incomplete thread part, the front edge of the screw thread cutting tool 8 (that is, the removal starting position 8S1) coincides with the starting position 7S of the incomplete thread part 7b (see FIG. 1). The screw thread cutting tool 8 moves in a tapered manner, thereby removing the apex 7C of the incomplete thread part 7b. The screw thread cutting tool 8 that completed the first removal process then moves to the removal starting position 8S21 in the first round of the second removal process.

The removal starting position 8S21 in the first round of the second removal process is set at a position displaced from the removal starting position 8S1 of the first removal process by the amount of displacement ΔX in the direction of the thread axis 1A (right-left direction X). In this example, the first-round removal starting position 8S21 is set at a position leftward relative to the removal starting position 8S1 (on the head-2 side). Similarly to the first removal process, the screw thread cutting tool 8 moves in a tapered manner, thereby removing the apex 7C of the incomplete thread part 7b in a recessed shape. The screw thread cutting tool 8 that completed the first removal process then moves to the removal starting position 8S22 in the second round.

The removal starting position 8S22 in the second round of the second removal process is set at a position further displaced from the first-round removal starting position 8S21 in the right-left direction X. In this example, the second-round removal starting position 8S22 is set at a position leftward relative to the first-round removal starting position 8S21 (on the head-2 side). Similarly to the first removal process, the screw thread cutting tool 8 moves in a tapered manner, thereby removing the apex 7C of the incomplete thread part 7b. The screw thread cutting tool 8 that completed the second round of the removal process then moves to the removal starting position 8S23 in the third round.

The removal starting position 8S23 in the third round of the second removal process is set at a position displaced from the removal starting position 8S1 of the first removal process in the right-left direction X. In this example, the third-round removal starting position 8S23 is set at a position rightward which is on the opposite side relative to the removal starting position 8S1 of the first removal process in the X direction (on the tail side). Similarly to the first removal process, the screw thread cutting tool 8 moves in a tapered manner, thereby removing the apex 7C of the incomplete thread part 7b. The screw thread cutting tool 8 that completed the third round of the removal process then moves to the removal starting position 8S24 in the fourth round.

The removal starting position 8S24 in the fourth round of the second removal process is set at a position further displaced from the third-round removal starting position 8S23 in the right-left direction X. In this example, the fourth-round removal starting position 8S24 is set at a position rightward relative to the third-round removal starting position 8S23 (on the tail side). Similarly to the first removal process, the screw thread cutting tool 8 moves in a tapered manner, thereby removing the apex 7C of the incomplete thread part 7b. The screw thread cutting tool 8 that completed the fourth round of the removal process then moves to a predetermined standby position.

As illustrated in FIG. 16, the removal starting position 8S1 of the first removal process and the four removal starting positions 8S21 to 8S24 of the second removal process are set on an imaginary horizontal line 7L (line in parallel with the thread axis 1A) of the apex 7C of the incomplete thread part 7b. In the respective removal processing steps, therefore, the front edge of the screw thread cutting tool 8 cuts off the apex 7C of the incomplete thread part 7b in a recessed shape in contact with the imaginary horizontal line 7L from outside (upper side).

In this example, the first removal process is performed once and the second removal process is performed four times. As a result, five cutting surfaces 7P (7P1 and 7P21 to 7P24) illustrated in FIG. 3 are helically formed in parallel (helically and adjacently formed in a recessed shape) in the apex 7C of the ridge in the incomplete thread part 7b on the head-2 side. These cutting surfaces 7P (7P1 and 7P21 to 7P24) constitute the surface of the apex 7C of the incomplete thread part 7b in contact with the imaginary horizontal line 7L from outside (upper side).

Next, the processing steps for removing the apex 7C of the ridge in the incomplete thread part 7b on the head-2 side are hereinafter schematically described referring to FIGS. 17 to 21.

First Removal Process (FIG. 17)

With the removal starting position 8S1 coinciding with the starting position 7S of the incomplete thread part 7b (see FIG. 4), the cutting blade is located so as to cut into the target part in a width smaller than the thread pitch 6P. Then, the screw thread cutting tool 8 moves in a tapered manner and thereby removes the apex 7C of the incomplete thread part 7b in a recessed shape. As a result, the cutting surface 7P1 is helically formed in the apex 7C.

Figure 18:
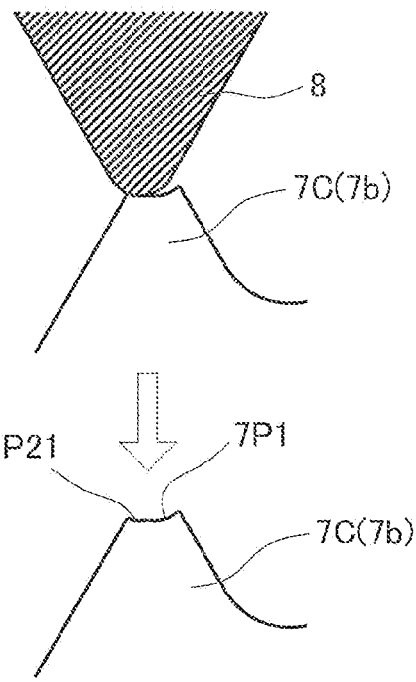
FIG. 18 is a schematic illustration of the second removal process (first round).

(First Round of) Second Removal Process (FIG. 18)

The removal starting position 8S21 is set at a position displaced from the removal starting position 8S1 (see FIG. 16). Then, the screw thread cutting tool 8 moves in a tapered manner similarly to the first removal process and thereby removes the apex 7C of the incomplete thread part 7b. As a result, the cutting surface 7P21 is helically formed in the apex 7C.

Figure 19:
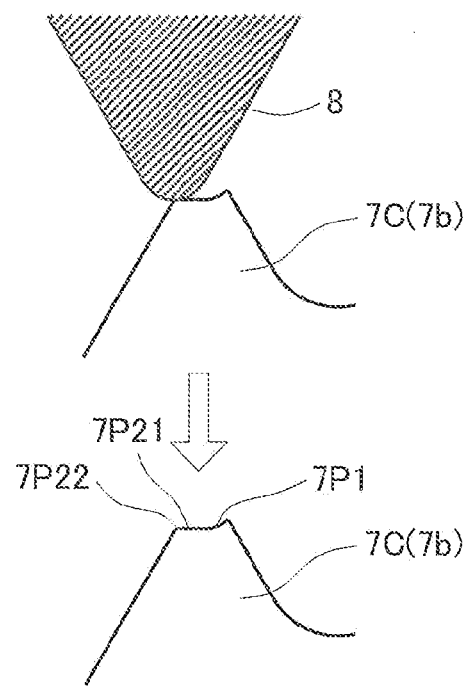
FIG. 19 is a schematic illustration of the second removal process (second round).

(Second Round of) Second Removal Process (FIG. 19)

The removal starting position 8S22 is set at a position further displaced from the removal starting position 8S21 (see FIG. 16). Then, the screw thread cutting tool 8 moves in a tapered manner similarly to the first removal process and thereby removes the apex 7C of the incomplete thread part 7b. As a result, the cutting surface 7P22 is helically formed in the apex 7C.

Figure 20:
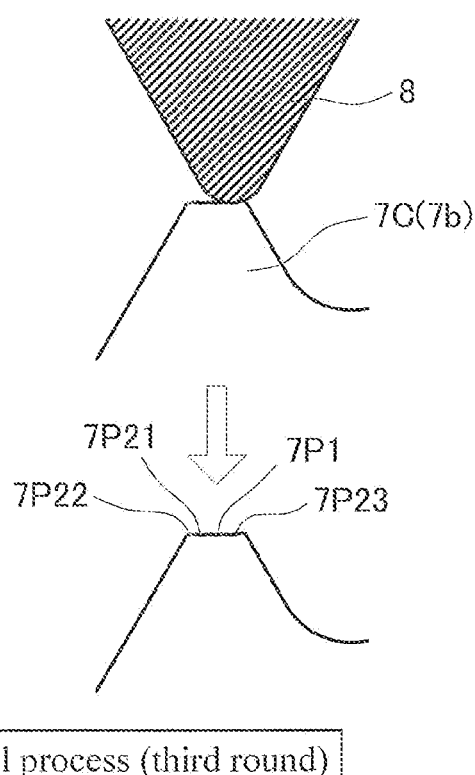
FIG. 20 is a schematic illustration of the second removal process (third round).

(Third Round of) Second Removal Process (FIG. 20)

The removal starting position 8S23 is set at a position displaced on the opposite side of the removal starting positions 8S21 and 8S22 (see FIG. 16). Then, the screw thread cutting tool 8 moves in a tapered manner similarly to the first removal process and thereby removes the apex 7C of the incomplete thread part 7b. As a result, the cutting surface 7P23 is helically formed in the apex 7C.

Figure 21:
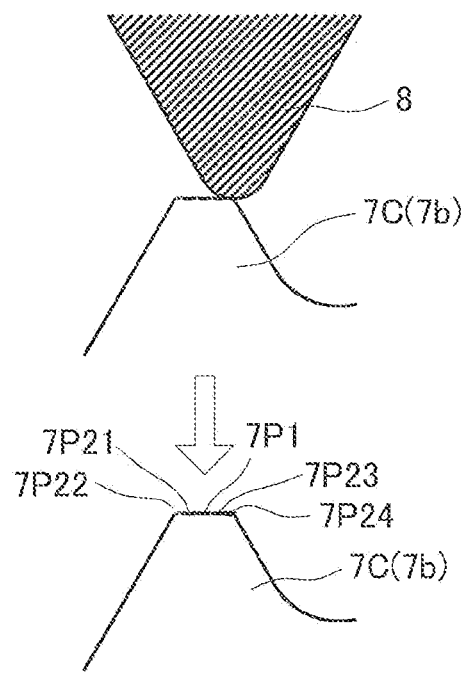
FIG. 21 is a schematic illustration of the second removal process (fourth round).

(Fourth Round of) Second Removal Process (FIG. 21)

The removal starting position 8S24 is set at a position further displaced from the removal starting position 8S23 (see FIG. 16). Then, the screw thread cutting tool 8 moves in a tapered manner similarly to the first removal process and thereby removes the apex 7C of the incomplete thread part 7b. As a result, the cutting surface 7P24 is helically formed in the apex 7C.

In FIG. 16, the first removal process may be omitted as far as the removal starting positions 8S21 to 8S24 of the second removal process can be set without using the removal starting position 8S1 of the first removal process (starting position 7S of the incomplete thread part 7b) as a reference position, and the number of the removal starting positions, 8S21 to 8S24, may be accordingly changed. Of the removal starting positions 8S21 to 8S24 of the second removal process, two of them are paired and set on the opposite sides in the X direction of the removal starting position 8S1 of the first removal process. It is arbitrarily changed how many removal starting positions are set on the respective sides, and the respective removal processing steps may be performed in different orders. In the second removal process, the amount of displacement ΔX of the removal starting positions 8S21 to 8S24 in the right-left direction X is about 0.01 to 0.2 mm based on the removal starting position 8S1 of the first removal process used as a reference position.

Thus, the plural cutting surfaces 7P (7P1 and 7P21 to 7P24) are helically formed in parallel in the apex 7C of the incomplete thread part 7b on the head-2 side too from the starting position 7S to the ending position 7E of the incomplete thread part 7a. By thus forming cutting surfaces, any sharp points and burrs are easily eliminated from the incomplete thread part 7b. In the respective removal processing steps, the apex 7C of the ridge alone is removed instead of completely removing the whole or a limited area of the incomplete thread part 7b. This helps to maintain a favorable engageability with another threaded fastener (threaded portion). Further, the cutting surfaces 7P (7P1 and 7P21 to 7P24) are continuous in parallel with the thread axis 1A (in other words, the corrugations formed by the continuous cutting surfaces 7P are evenly formed in parallel with the thread axis 1A). This is a great advantage for reducing the cost of position adjustment control.

MODIFIED EXAMPLE

FIGS. 25 to 33 are illustrations of a modified example of FIG. 1 (Example 1). In a shaft portion 3 of a hexagon head bolt 1 illustrated in FIG. 25, a complete thread part 6 including an external thread (right-hand thread, single screw thread) is formed by using a screw thread cutting tool 8 similar to that of FIG. 1. The complete thread part 6 is formed at a pitch 6P to a thread height 6H (see FIGS. 26 and 27). The shaft portion 3 further has; an incomplete thread part 7a formed on the tail side of the complete thread part 6 (on the thread-starting side), and another incomplete thread part 7b on the head-2 side thereof (on the thread-ending side).

As illustrated in FIG. 26, an apex 7C of the ridge in the incomplete thread part 7a on the tail-part side has cutting surfaces 7P' (7P1' and 7P21' to 7P24') including a plurality of (five in total in this example) cutting marks formed by cutting with a front edge of a left-hand thread cutting tool 8' (for cutting reverse screw threads) different from the screw thread cutting tool 8 (see FIG. 1). The cutting surfaces 7P' are helically formed in parallel from an ending position 7E to a starting position 7S of the incomplete thread part 7a (see FIG. 25), in other words, formed continuously and adjacent to one another in a thread pitch direction. In a microscopic view, the front edge of the left-hand thread cutting tool 8' has a cutting blade having a width smaller than the thread pitch 6P illustrated in FIG. 25, and the front edge is surely formed with some degree of roundness (for example, radius of the edge is 0.1 mm). The cutting surfaces 7P' (7P1' and 7P21' to 7P24') formed in the apex 7C illustrated in FIG. 26, therefore, have widths smaller than the thread pitch 6P and recessed or dented shapes because of the roundness on the front edge of the left-hand thread cutting tool 8'. The cutting surfaces 7P' illustrated in FIG. 26 are adjacent to one another and continuous in the direction of the thread axis 1A (thread pitch direction) in such a curved manner that a center part in the ridge of the incomplete thread part 7a is raised (in other words, in a manner that a center part in each of the corrugations formed by the continuous cutting surfaces 7P' protrudes).

As illustrated in FIG. 27, an apex 7C of the ridge in the incomplete thread part 7b on the head-2 side too has cutting surfaces 7P' (7P1' and 7P21' to 7P24') including a plurality of (five in total in this example) cutting marks formed by cutting with the front edge of the left-hand thread cutting tool 8'. The cutting surfaces 7P' are helically formed in parallel from the ending position 7E to the starting position 7S of the incomplete thread part 7b, in other words, formed continuously and adjacent to one another in the thread pitch direction. The cutting surfaces 7P' (7P1' and 7P21' to 7P24') formed in the apex 7C illustrated in FIG. 27 also have widths smaller than the thread pitch 6P and recessed or dented shapes because of the roundness on the front edge of the left-hand thread cutting tool 8'. The plural cutting surfaces 7P' illustrated in FIG. 27 are in parallel with the thread axis 1A (see FIG. 25) and continuous and adjacent to one another in the direction of the thread axis 1A (in other words, the corrugations formed by the continuous cutting surfaces 7P' are evenly formed in parallel with the thread axis 1A).

Figure 28:
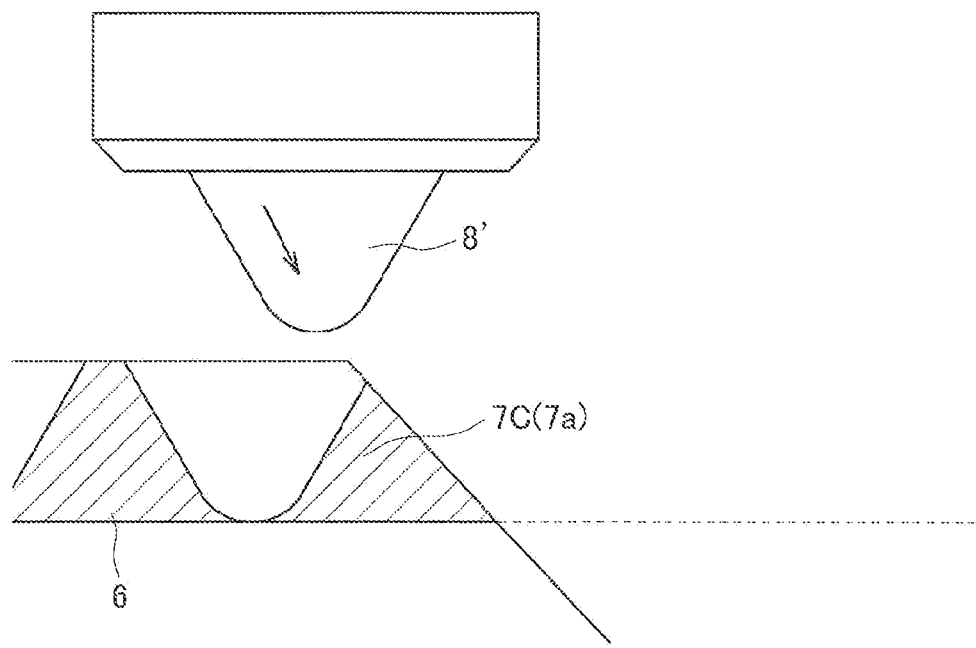
FIG. 28 is an illustration of the formation of an cutting surface in the first removal process.
Figure 29:
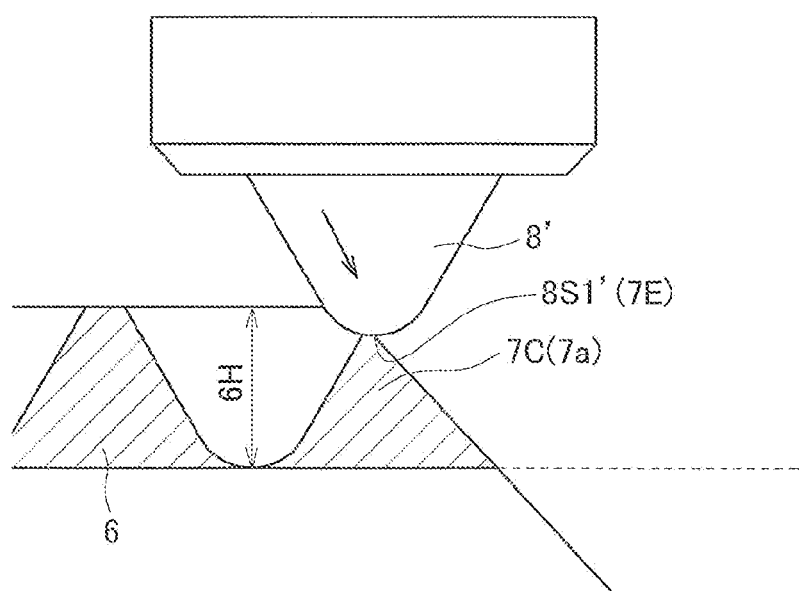
FIG. 29 is an illustration continued from FIG. 28.

FIGS. 28 to 33 are illustrations of the formation of an cutting surface by a first removal process performed to the incomplete thread part on the tail side. As illustrated in FIGS. 28 and 29, in the first removal process for removing the apex 7C of the incomplete thread part 7a on the tail side, the ending position 7E of the incomplete thread part 7a in the direction of rotation and the front edge of the left-hand thread cutting tool 8' are synchronized with each other so that a removal starting position 8S1' of the incomplete thread part 7a coincides with the ending position 7E of the incomplete thread part 7a.

Figure 30:
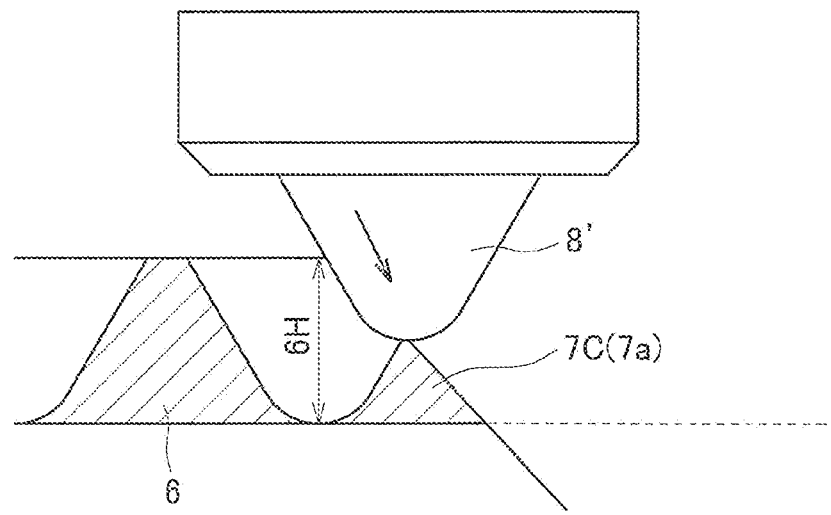
FIG. 30 is an illustration continued from FIG. 29.
Figure 31:
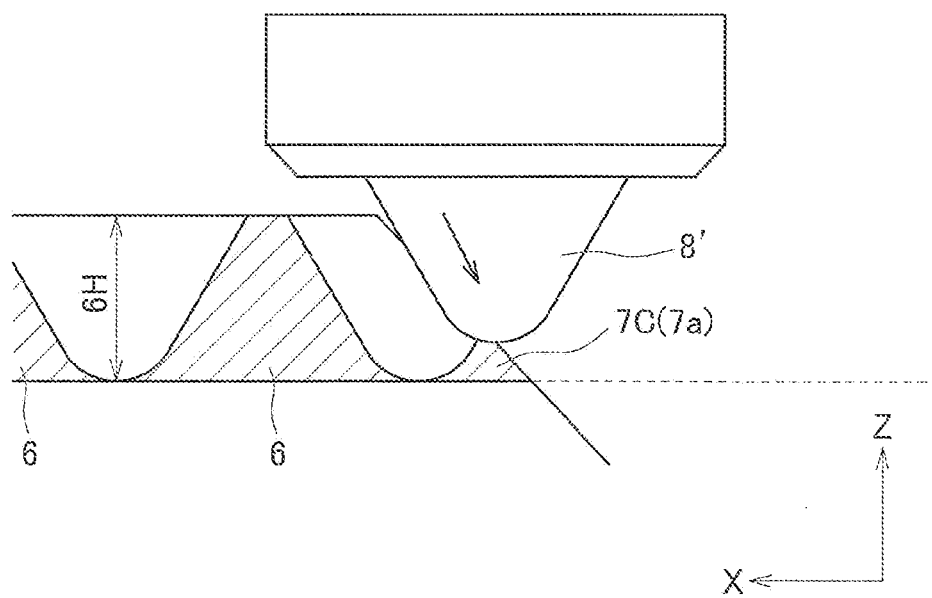
FIG. 31 is an illustration continued from FIG. 30.
Figure 32:
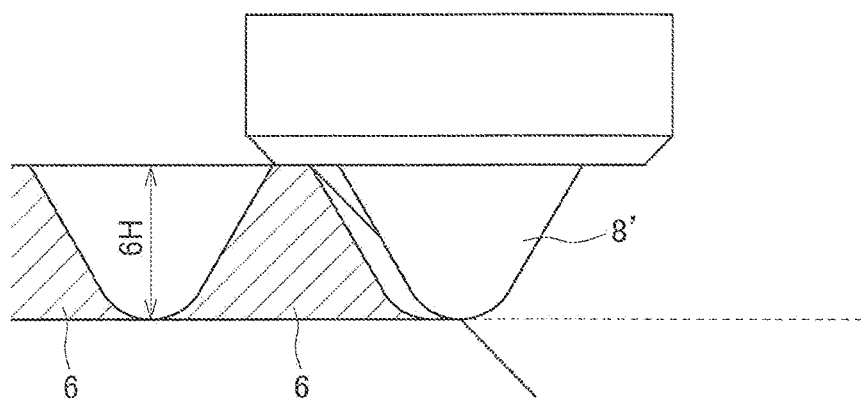
FIG. 32 is an illustration continued from FIG. 31.

As illustrated in FIGS. 30 to 32, while the incomplete thread part 7a (hexagon head bolt 1) is being rotated in the direction where the reverse thread cutting advances, the left-hand thread cutting tool 8' is moved in a diagonal direction relative to the thread axis 1A (see FIG. 25), so that the apex 7C of the incomplete thread part 7a is removed in a recessed shape. Because the direction where the incomplete thread part 7a is rotated in the first removal process in the direction where the reverse thread cutting advances (in a direction opposite to the direction of rotation during the thread cutting), it is more specifically the clockwise direction as illustrated with an arrow in the side view of FIG. 25. The left-hand thread cutting tool 8' moves in a tapered manner that is defined depending on the pitch 6P and the thread height 6H of the complete thread part 6. In the cross sections illustrated in FIGS. 30 to 32 including the thread axis 1A, the left-hand thread cutting tool 8' two-dimensionally moves in a diagonal direction resulting from combining the direction of the thread axis 1A (right-left direction X, that is, the thread pitch direction) and a direction orthogonal to the thread axis 1A (up-down direction). However, the movement of the left-hand thread cutting tool 8' may include a three-dimensional movement.

Figure 33:
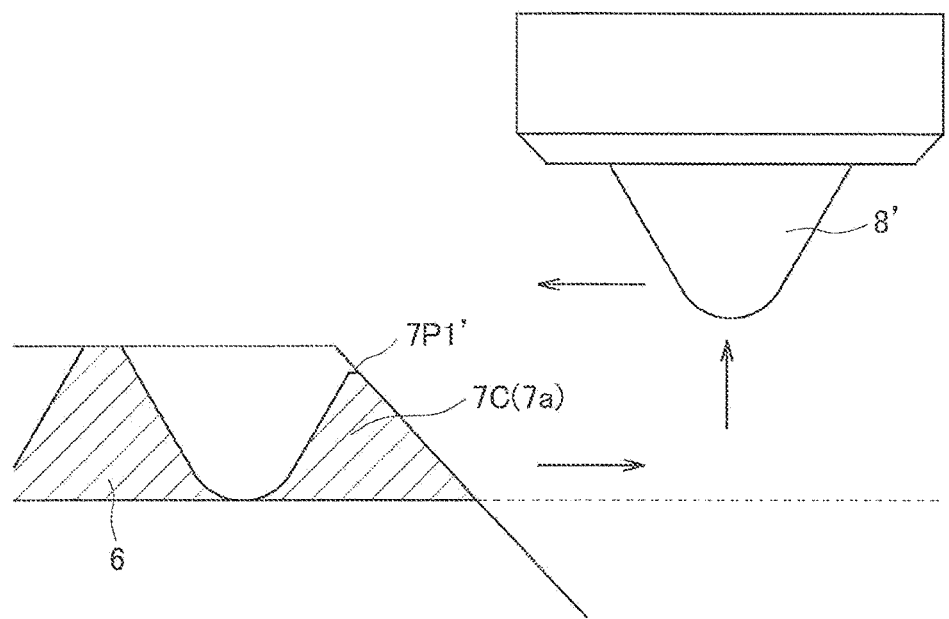
FIG. 33 is an illustration continued from FIG. 32.

Then, as illustrated in FIG. 33, the cutting surface 7P1' cut in a recessed shape in a predetermined depth by the front edge of the left-hand thread cutting tool 8' is helically formed in the apex 7C of the incomplete thread part 7a from the ending position 7E to the starting position 7S of the incomplete thread part 7a (see FIGS. 29 and 25). The left-hand thread cutting tool 8' that completed the first removal process temporarily moves upward as illustrated in FIG. 33 and then moves to a removal starting position in the first round of the second removal process (not illustrated in the drawings).

By performing the second removal process similarly with the left-hand thread cutting tool 8', the cutting surfaces 7P21' to 7P24' are helically formed in a recessed shape from the ending position 7E to the starting position 7S of the incomplete thread part 7a (see FIGS. 25 and 26). By performing the first and second removal processes similarly with the left-hand thread cutting tool 8', the cutting surfaces 7P' (7P1' and 7P21' to 7P24') are helically formed in a recessed shape from the ending position 7E to the starting position 7S of the incomplete thread part 7b in the head side (see FIGS. 25 and 27).

In the case where the screw thread cutting tool 8 (see FIG. 1) and the left-hand thread cutting tool 8' (see FIG. 25) are replaceable at short intervals, the second removal process may be performed in a reciprocating manner. For example, the cutting surfaces 7P21 and 7P23 are helically formed in a recessed shape in odd-numbered rounds of the second removal process by using the screw thread cutting tool 8 from the starting position 7S to the ending position 7E of the incomplete thread part 7a, 7b (see FIGS. 2 and 3) as described in the Example 1, and the cutting surfaces 7P22' and 7P24' are helically formed in a recessed shape in even-numbered rounds of the second removal process by using the left-hand thread cutting tool 8' from the ending position 7E to the starting position 7S of the incomplete thread part 7a, 7b (see FIGS. 26 and 27) as described in the modified example.

EXAMPLE 2

Figure 22:
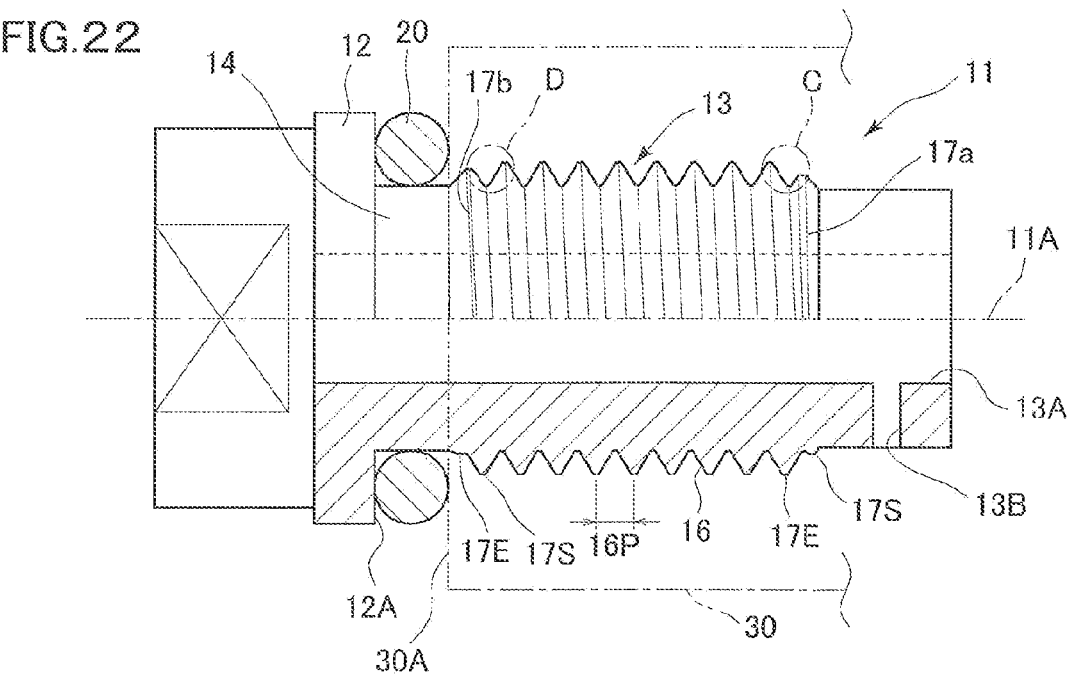
FIG. 22 is a front view in half cross section of a pipe thread, an example of the threaded fastener, to which the invention is applied.
Figure 23:
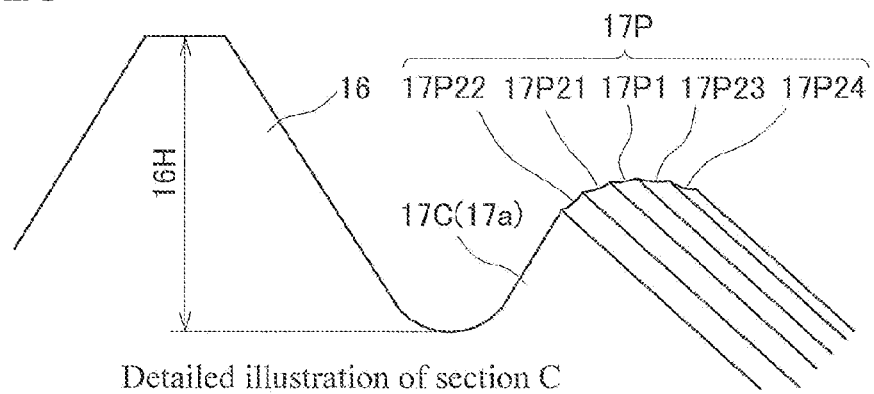
FIG. 23 is an enlarged front view of a section C illustrated in FIG. 22.
Figure 24:
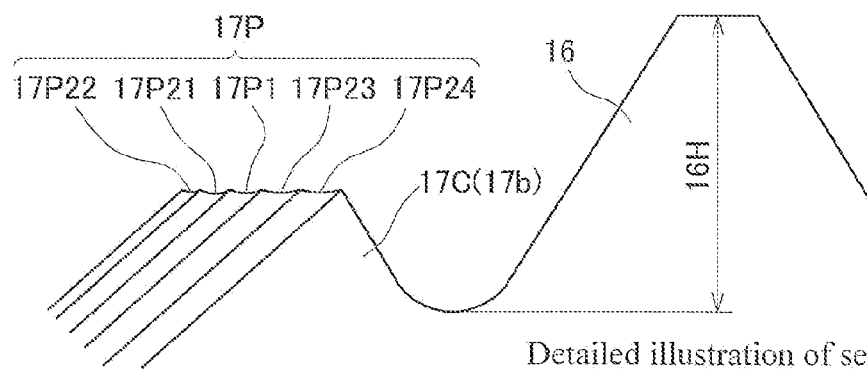
FIG. 24 is an enlarged front view of a section D illustrated in FIG. 22.

FIGS. 22 to 24 illustrate an example in which the invention is applied to a pipe thread as a threaded fastener. A pipe thread 11 illustrated in FIG. 22 is made of a steel material. In the pipe thread 11, a screw thread is formed in a shaft portion 13 when the screw thread cutting tool 8 (see FIG. 1) is moved at a predetermined pitch 16P in parallel with a thread axis 11A from the tail side toward the side of a head 12 of the shaft portion 13 while the shaft portion 13 is being rotated based on the thread axis 11A as a rotational center in a manner similar to the hexagon head bolt illustrated in FIG. 1 (Example 1).

The shaft portion 13 of the pipe thread 11 has a complete thread part 16 including an external thread (right-hand thread, single screw thread) formed at the pitch 16P to a thread height 16H (see FIGS. 23 and 24). The shaft portion 13 further has; an incomplete thread part 17a formed on the tail side of the complete thread part 16 (on the thread-starting side), and another incomplete thread part 17b on the head-12 side thereof (on the thread-ending side).

A center part of the shaft portion 13 of the pipe thread 11 has an inflow passage 13A that starts from the tail side thereof and reaches the head 12. A tail-side outer peripheral surface of the shaft portion 13 has a communicating passage 13B branched from the inflow passage 13A in a radial direction. The pipe thread 11 is fixedly attached to a housing 30 made of an aluminum alloy through engagement with an internal thread (not illustrated in the drawings) formed in the housing 30. A fluid in the housing 30 flows into the inflow passage 13A and the communicating passage 13B. To increase air-tightness of the pipe thread 11, an O ring 20 (compression-deformable member) is inserted in a cylindrical portion 14 located at a neck part below the head 12, and the O ring 20 is held between a seating surface 12A of the head 12 and a seating surface 30A of the housing 30.

As illustrated in FIG. 23, an apex 17C of the ridge in the incomplete thread part 17a on the tail side has cutting surfaces 17P (17P1 and 17P21 to 17P24) including a plurality of (five in total in this example) cutting marks formed by cutting with the front edge of the screw thread cutting tool 8 (see FIG. 1). The cutting surfaces 17P are helically formed in parallel from a starting position 17S to an ending position 17E of the incomplete thread part 17a (see FIG. 22), in other words, formed continuously and adjacent to one another in a thread pitch direction. The cutting surfaces 17P (17P1 and 17P21 to 17P24) formed in the apex 17C illustrated in FIG. 23, therefore, have widths smaller than the pitch 16P and recessed or dented shapes because of the roundness on the front edge of the screw thread cutting tool 8. In a manner similar to the illustration of FIG. 2 (Example 1), the cutting surfaces 17P illustrated in FIG. 23 are adjacent to one another and continuous in the direction of the thread axis 11A (thread pitch direction) in such a curved manner that a center part in the ridge of the incomplete thread part 17a is raised (in other words, in a manner that a center part in each of the corrugations formed by the continuous cutting surfaces 17P protrudes).

As illustrated in FIG. 24, an apex 17C of the ridge in the incomplete thread part 17b on the head-12 side too has cutting surfaces 17P (17P1 and 17P21 to 17P24) including a plurality of (five in total in this example) cutting marks formed by cutting with the front edge of the screw thread cutting tool 8. The cutting surfaces 17P are helically formed in parallel from the starting position 17S to the ending position 17E of the incomplete thread part 17b, in other words, formed continuously and adjacent to one another in the thread pitch direction. The cutting surfaces 17P (17P1 and 17P21 to 17P24) formed in the apex 17C illustrated in FIG. 24 also have widths smaller than the pitch 16P and recessed or dented shapes because of the roundness on the front edge of the screw thread cutting tool 8. Similarly to the illustration of FIG. 3 (Example 1), the plural cutting surfaces 17P illustrated in FIG. 24 are in parallel with the thread axis 11A (see FIG. 22) and continuous and adjacent to one another in the direction of the thread axis 11A (in other words, the corrugations formed by the continuous cutting surfaces 17P are evenly formed in parallel with the thread axis 11A).

In the incomplete thread part 17a on the thread-starting side of the pipe thread 11, therefore, any sharp points and burrs are eliminated from the apex 17C of the thread, and the engagement with the internal screw of the housing 30 is facilitated. Especially, even if the O ring 20, elastically trying to regain its shape against a fastening force during the engagement, may exert a restoring force that pulls the incomplete thread part 17a on the thread-starting side toward the head-12 side, this example can eliminate the likelihood of cutting chips and any damage on the internal thread of the housing 30 that may be caused by sharp points and/or burrs. In the incomplete thread part 17b on the thread-ending side of the pipe screw 11, any sharp points and burrs can be easily removed from the apex 17C of the thread ridge. This is a great advantage for reducing the cost of position adjustment control.

The technical matters of the hexagon head bolt 1 described in the Example 1 (FIGS. 1 to 21) and the modified example (FIGS. 25 to 33) are applicable to the pipe thread 11 of the Example 2 (FIGS. 22 to 24).

Description of Reference Symbols 1 hexagon head bolt (threaded fastener)
1A thread axis
2 head
3 shaft portion
4 cylindrical portion
5 thread undercut
6 complete thread part
6P pitch
6H thread height
7a, 7b incomplete thread part
7C apex of ridge
7P (7P1, 7P21 to 7P24) cutting surface (cutting mark)
7I imaginary inscribed circle
7L imaginary horizontal line
7S starting position
7E ending position
8 screw thread cutting tool
8S1, 8S21 to 8S24 removal starting position
11 pipe thread (threaded fastener)
11A thread axis
12 head
12A seating surface
13 shaft portion
13A inflow passage
13B communicating passage
14 cylindrical portion
16 complete thread part
16P pitch
16H thread height
71a, 17b incomplete thread part
17C apex of ridge
17P (17P1, 17P21 to 17P24) cutting surface (cutting mark)
17S starting position
17E ending position
20 O ring (compression-deformable member)
30 housing
30A seating surface
R radius
ΔX amount of displacement in right-left direction (direction of thread-axis)
ΔZ amount of displacement in up-down direction (direction orthogonal to direction of thread-axis)

What is claimed is:

1. A method of manufacturing a work having a screw thread, comprising:
    removing an apex of a ridge in an incomplete thread part helically formed in the work by screw thread cutting, by a tool equipped with a cutting blade by:
    forming first helical cutting mark at the apex of the incomplete thread part, and
    forming additional helical cutting marks positionally displaced relative to the first helical cutting mark,
    wherein in a state where the tool is located so that the cutting blade cuts into the apex of the incomplete thread part in a width smaller than a thread pitch and the work is rotated around a thread axis that is a center line of the work, the cutting blade of the tool is moved in a direction resulting from combining a movement in a direction of the thread pitch and a movement in a direction of height of the incomplete thread part to allow the cutting blade of the tool to cut the apex through a linear relative movement along the apex helically formed in the incomplete thread part from a starting position to an ending position of the incomplete thread part or from the ending position to the starting position, so that one round of cutting for the apex of the incomplete thread part leaves the first helical cutting mark, the one round of cutting helically is repeated plural times to form the additional helical cutting marks with the cutting blade of the tool being positionally displaced relative to the incomplete thread part in at least the direction of the thread pitch toward the ending position side or the starting position side of the work, and the apex of the incomplete thread part is accordingly removed so that a plurality of the helical cutting marks are adjacent to one another in parallel and continuous in the direction of the thread pitch.

2. The method of manufacturing a work having a screw thread as claimed in claim 1, wherein
    the screw thread cutting performed prior to the process for removing the apex of the incomplete thread part forms a screw thread in a rotating work by making a tool contact the rotating work, the tool having a front edge equipped with a cutting blade having a width smaller than a pitch of the screw thread, and
    the process for removing the incomplete thread part is performed subsequent to the screw thread cutting process with the tool used in the screw thread cutting process.

3. The method of manufacturing a work having a screw thread as claimed in claim 1 is applied to a threaded fastener, the threaded fastener has a shaft portion having one incomplete thread part formed on a tail side of a complete thread part, and another incomplete thread part on a head side thereof, and removing the apex of the incomplete thread part is performed for each incomplete thread part.

4. The method of manufacturing a work having a screw thread as claimed in claim 1 is applied to a pipe thread as a threaded fastener, the pipe thread has a shaft portion having one incomplete thread part formed on a tail side of a complete thread part, and another incomplete thread part on a head side where a compression-deformable member is inserted, and removing the apex of the incomplete thread part is performed for each incomplete thread part.

* * * * *